(12) United States Patent
Strober

(10) Patent No.: US 11,860,937 B2
(45) Date of Patent: Jan. 2, 2024

(54) PLAY CONTROL OF CONTENT ON A DISPLAY DEVICE

(71) Applicant: Touchstream Technologies Inc., Valhalla, NY (US)

(72) Inventor: David Strober, Rye, NY (US)

(73) Assignee: TOUCHSTREAM TECHNOLOGIES INC., Valhalla, NY (US)

( * ) Notice: Subject to any disclaimer, the term of this patent is extended or adjusted under 35 U.S.C. 154(b) by 0 days.

(21) Appl. No.: 17/962,649

(22) Filed: Oct. 10, 2022

(65) Prior Publication Data
US 2023/0031022 A1    Feb. 2, 2023

Related U.S. Application Data

(63) Continuation of application No. 17/396,446, filed on Aug. 6, 2021, now Pat. No. 11,475,062, which is a
(Continued)

(51) Int. Cl.
*G06F 16/74* (2019.01)
*G06F 16/951* (2019.01)
*G06F 9/451* (2018.01)

(52) U.S. Cl.
CPC .............. *G06F 16/74* (2019.01); *G06F 9/452* (2018.02); *G06F 16/951* (2019.01)

(58) Field of Classification Search
CPC ......... G06F 16/74; G06F 9/452; G06F 16/951
See application file for complete search history.

(56) References Cited

U.S. PATENT DOCUMENTS

| 4,816,905 A | 3/1989 | Tweedy et al. |
| 4,855,842 A | 8/1989 | Hayes et al. |

(Continued)

FOREIGN PATENT DOCUMENTS

| CN | 101534449 A | 9/2009 |
| CN | 101577650 A | 11/2009 |

(Continued)

OTHER PUBLICATIONS

Himonas, S. D., and Gelman, A. D., "A Digital Storage Media-Command and Control Network", IEEE, pp. 766-770 (1997).
(Continued)

*Primary Examiner* — Tadesse Hailu
*Assistant Examiner* — Darrin Hope
(74) *Attorney, Agent, or Firm* — SHOOK, HARDY & BACON L.L.P.

(57) ABSTRACT

A system for controlling playback of various types of content includes a first computing device that provides a unique identifier to a second computing device to establish an association there between. By virtue of the established association, the second computing device can send one or more messages to the first computing device, the one or more messages referencing a piece of content associated with a first media playing element of a plurality of media playing elements, and one or more commands corresponding to the first media playing element. The first computing device can select the first media playing element based on the received one or more messages, and control how the first media playing element plays the referenced piece of content utilizing the one or more commands.

20 Claims, 9 Drawing Sheets

Related U.S. Application Data continuation of application No. 16/917,095, filed on Jun. 30, 2020, now Pat. No. 11,086,934, which is a continuation of application No. 15/687,249, filed on Aug. 25, 2017, now Pat. No. 11,048,751, which is a continuation of application No. 13/532,546, filed on Jun. 25, 2012, now Pat. No. 9,767,195, which is a continuation-in-part of application No. 13/157,821, filed on Jun. 10, 2011, now Pat. No. 8,904,289.

(60) Provisional application No. 61/477,998, filed on Apr. 21, 2011.

(56) References Cited

U.S. PATENT DOCUMENTS

| | | |
|---|---|---|
| 5,189,673 A | 2/1993 | Burton et al. |
| 5,307,055 A | 4/1994 | Baskin et al. |
| 5,608,446 A | 3/1997 | Carr et al. |
| 5,608,447 A | 3/1997 | Farry et al. |
| 5,613,137 A | 3/1997 | Bertram et al. |
| 5,631,903 A | 5/1997 | Dianda et al. |
| 5,636,211 A | 6/1997 | Newlin et al. |
| 5,767,897 A | 6/1998 | Howell |
| 5,875,311 A | 2/1999 | Bertram et al. |
| 5,878,311 A | 3/1999 | Ichinokawa |
| 5,935,232 A | 8/1999 | Lambrecht et al. |
| 5,945,987 A | 8/1999 | Dunn |
| 6,008,777 A | 12/1999 | Yiu |
| 6,097,441 A | 8/2000 | Allport |
| 6,104,334 A | 8/2000 | Allport |
| 6,119,154 A | 9/2000 | Weaver et al. |
| 6,181,713 B1 | 1/2001 | Patki et al. |
| 6,182,094 B1 | 1/2001 | Humpleman et al. |
| 6,211,869 B1 | 4/2001 | Loveman et al. |
| 6,252,889 B1 | 6/2001 | Patki et al. |
| 6,271,837 B1 | 8/2001 | Naiff |
| 6,330,595 B1 | 12/2001 | Ullman et al. |
| 6,467,090 B1 | 10/2002 | Brodigan |
| 6,476,825 B1 | 11/2002 | Croy et al. |
| 6,496,122 B2 | 12/2002 | Sampsell |
| 6,510,553 B1 | 1/2003 | Hazra |
| 6,553,567 B1 | 4/2003 | Wugofski et al. |
| 6,594,826 B1 | 7/2003 | Rao et al. |
| 6,633,547 B1 | 10/2003 | Akatsu et al. |
| 6,651,089 B1 | 11/2003 | Stead |
| 6,756,965 B2 | 6/2004 | Combs et al. |
| 6,978,424 B2 | 12/2005 | Safadi |
| 7,058,356 B2 | 6/2006 | Slotznick |
| 7,088,823 B2 | 8/2006 | Fetkovich |
| 7,114,173 B2 | 9/2006 | Urdang et al. |
| 7,136,709 B2 | 11/2006 | Arling et al. |
| 7,330,875 B1 | 2/2008 | Parasnis et al. |
| 7,383,229 B2 | 6/2008 | Jacoby |
| 7,424,718 B2 | 9/2008 | Dutton |
| 7,433,922 B2 | 10/2008 | Engstrom |
| 7,440,972 B2 | 10/2008 | Oetzel |
| 7,453,454 B2 | 11/2008 | Allen et al. |
| 7,466,823 B2 | 12/2008 | Vestergaard et al. |
| 7,509,588 B2 | 3/2009 | Van Os et al. |
| 7,551,918 B2 | 6/2009 | Bowen et al. |
| 7,614,070 B2 | 11/2009 | Urdang et al. |
| 7,614,073 B2 | 11/2009 | Hugenberg et al. |
| 7,689,931 B2 | 3/2010 | Koga et al. |
| 7,769,827 B2 | 8/2010 | Girouard et al. |
| 7,774,708 B2 | 8/2010 | Bell et al. |
| 7,814,144 B2 | 10/2010 | Koyama et al. |
| 7,835,505 B2 | 11/2010 | Toyama et al. |
| 7,849,485 B2 | 12/2010 | Paik et al. |
| 7,878,904 B2 | 2/2011 | Maehiro |
| 7,913,278 B2 | 3/2011 | Ellis et al. |
| 7,949,606 B1 | 5/2011 | Sweet |
| 7,956,846 B2 | 6/2011 | Ording et al. |
| 8,014,768 B2 | 9/2011 | Ackley |
| 8,060,631 B2 | 11/2011 | Collart et al. |
| 8,086,679 B2 | 12/2011 | Nobori et al. |
| 8,171,507 B2 | 5/2012 | Hironaka et al. |
| 8,230,360 B2 | 7/2012 | Ma et al. |
| 8,238,887 B2 | 8/2012 | Filipov |
| 8,250,608 B2 | 8/2012 | Hayes et al. |
| 8,255,968 B2 | 8/2012 | Louie et al. |
| 8,316,308 B2 | 11/2012 | Sherman et al. |
| 8,344,870 B2 | 1/2013 | Evans et al. |
| 8,373,660 B2 | 2/2013 | Pallakoff |
| 8,402,494 B1 | 3/2013 | Hu et al. |
| 8,418,084 B1 | 4/2013 | Tischer |
| 8,544,046 B2 | 9/2013 | Gran et al. |
| 8,572,488 B2 | 10/2013 | Phillips et al. |
| 8,614,625 B2 | 12/2013 | Alsina et al. |
| 8,620,284 B2 | 12/2013 | Filipov |
| 8,644,757 B2 | 2/2014 | Curcio et al. |
| 8,659,553 B1 | 2/2014 | Chan et al. |
| 8,671,440 B2 | 3/2014 | Damola et al. |
| 8,738,536 B2 | 5/2014 | Strom et al. |
| 8,738,737 B2 | 5/2014 | Baldini et al. |
| 8,739,074 B2 | 5/2014 | Kinoshita |
| 8,739,294 B2 | 5/2014 | Risan |
| 8,743,284 B2 | 6/2014 | Russell et al. |
| 8,744,434 B2 | 6/2014 | Funderburk et al. |
| 8,745,228 B2 | 6/2014 | Beckert et al. |
| 8,745,388 B2 | 6/2014 | Kanungo |
| 8,751,159 B2 | 6/2014 | Hall |
| 8,751,520 B1 | 6/2014 | Bhattacharjee et al. |
| 8,751,793 B2 | 6/2014 | Ginter et al. |
| 8,752,016 B2 | 6/2014 | Hernandez Porras et al. |
| 8,755,919 B2 | 6/2014 | Pyle |
| 8,756,333 B2 | 6/2014 | Janniak et al. |
| 8,756,505 B2 | 6/2014 | Gonze et al. |
| 8,761,351 B1 | 6/2014 | Daly et al. |
| 8,761,792 B2 | 6/2014 | Sennett et al. |
| 8,762,240 B2 | 6/2014 | Sogo et al. |
| 8,762,548 B1 | 6/2014 | Kessel et al. |
| 8,763,081 B2 | 6/2014 | Bogdanovic et al. |
| 8,782,262 B2 | 7/2014 | Collart et al. |
| 8,789,086 B2 | 7/2014 | McCoy et al. |
| 8,875,180 B2 | 10/2014 | Demchenko et al. |
| 8,880,491 B2 | 11/2014 | Morris |
| 8,918,812 B2 | 12/2014 | Hayward |
| 9,071,792 B2 | 6/2015 | Alsina et al. |
| 9,148,756 B2 | 9/2015 | Filipov |
| 9,185,171 B2 | 11/2015 | Pahlavan et al. |
| 9,258,609 B2 | 2/2016 | Odryna et al. |
| 9,420,025 B2 | 8/2016 | Park |
| 9,490,998 B1 | 11/2016 | Danciu et al. |
| 9,680,886 B2 | 6/2017 | Arunachalam et al. |
| 9,720,887 B2 | 8/2017 | Pappu et al. |
| 2002/0034193 A1 | 3/2002 | Patki et al. |
| 2002/0075332 A1 | 6/2002 | Geilfuss, Jr. et al. |
| 2002/0083147 A1 | 6/2002 | Ripperger |
| 2002/0120666 A1 | 8/2002 | Landsman et al. |
| 2002/0129102 A1 | 9/2002 | Landsman et al. |
| 2002/0133518 A1 | 9/2002 | Landsman et al. |
| 2002/0198778 A1 | 12/2002 | Landsman et al. |
| 2003/0004804 A1 | 1/2003 | Landsman et al. |
| 2003/0005000 A1 | 1/2003 | Landsman et al. |
| 2003/0018885 A1 | 1/2003 | Landsman et al. |
| 2003/0023488 A1 | 1/2003 | Landsman et al. |
| 2003/0028565 A1 | 2/2003 | Landsman et al. |
| 2003/0112258 A1 | 6/2003 | Dietz et al. |
| 2003/0112268 A1 | 6/2003 | Wettach |
| 2003/0142127 A1 | 7/2003 | Markel |
| 2003/0182663 A1 | 9/2003 | Gudorf et al. |
| 2004/0008972 A1 | 1/2004 | Haken |
| 2004/0049743 A1 | 3/2004 | Bogward |
| 2004/0088728 A1 | 5/2004 | Shimizu |
| 2004/0268224 A1 | 12/2004 | Balkus et al. |
| 2004/0268451 A1 | 12/2004 | Robbin et al. |
| 2005/0034151 A1 | 2/2005 | Abramson |
| 2005/0144305 A1 | 6/2005 | Fegan, II et al. |
| 2005/0149970 A1 | 7/2005 | Fairhurst et al. |
| 2006/0062544 A1 | 3/2006 | Southwood et al. |
| 2006/0083194 A1 | 4/2006 | Dhrimaj et al. |
| 2006/0085823 A1 | 4/2006 | Bell et al. |
| 2006/0098624 A1 | 5/2006 | Morgan et al. |

(56) References Cited

U.S. PATENT DOCUMENTS

| | | |
|---|---|---|
| 2006/0101098 A1 | 5/2006 | Morgan et al. |
| 2006/0203758 A1 | 9/2006 | Tee et al. |
| 2006/0263038 A1 | 11/2006 | Gilley |
| 2006/0265657 A1 | 11/2006 | Gilley |
| 2007/0041528 A1 | 2/2007 | Menon et al. |
| 2007/0050054 A1 | 3/2007 | Sambandam Guruparan et al. |
| 2007/0052868 A1 | 3/2007 | Chou et al. |
| 2007/0055986 A1 | 3/2007 | Gilley et al. |
| 2007/0083540 A1 | 4/2007 | Gundla et al. |
| 2007/0094408 A1 | 4/2007 | Gundla et al. |
| 2007/0112785 A1 | 5/2007 | Murphy et al. |
| 2007/0136778 A1 | 6/2007 | Birger et al. |
| 2007/0150963 A1 | 6/2007 | Lee et al. |
| 2007/0152978 A1 | 7/2007 | Kocienda et al. |
| 2007/0152980 A1 | 7/2007 | Kocienda et al. |
| 2007/0155506 A1 | 7/2007 | Malik |
| 2007/0156855 A1 | 7/2007 | Johnson |
| 2007/0202923 A1 | 8/2007 | Jung et al. |
| 2007/0226238 A1 | 9/2007 | Kiilerich et al. |
| 2007/0282889 A1* | 12/2007 | Ruan ............... G06F 8/30 707/999.102 |
| 2007/0288715 A1 | 12/2007 | Boswell et al. |
| 2007/0294621 A1 | 12/2007 | Hansen et al. |
| 2008/0008439 A1 | 1/2008 | Liu et al. |
| 2008/0028037 A1 | 1/2008 | Moyer et al. |
| 2008/0034394 A1 | 2/2008 | Jacobs et al. |
| 2008/0040758 A1 | 2/2008 | Beetcher et al. |
| 2008/0077526 A1 | 3/2008 | Arumugam |
| 2008/0104267 A1 | 5/2008 | Dawson |
| 2008/0126943 A1 | 5/2008 | Parasnis et al. |
| 2008/0140849 A1 | 6/2008 | Collazo |
| 2008/0155600 A1 | 6/2008 | Klappert et al. |
| 2008/0162670 A1 | 7/2008 | Chapweske et al. |
| 2008/0178198 A1 | 7/2008 | Gauba |
| 2008/0187279 A1 | 8/2008 | Gilley et al. |
| 2008/0189617 A1 | 8/2008 | Covell et al. |
| 2008/0235588 A1 | 9/2008 | Gonze et al. |
| 2008/0250190 A1 | 10/2008 | Johnson |
| 2008/0267369 A1 | 10/2008 | Parlamas et al. |
| 2008/0270881 A1 | 10/2008 | Meyer et al. |
| 2008/0301737 A1 | 12/2008 | Hjelmeland Almas et al. |
| 2009/0013387 A1 | 1/2009 | Paas et al. |
| 2009/0019492 A1 | 1/2009 | Grasset |
| 2009/0049373 A1 | 2/2009 | Sharma et al. |
| 2009/0077467 A1 | 3/2009 | Adappa et al. |
| 2009/0100477 A1 | 4/2009 | Jeffs |
| 2009/0108057 A1 | 4/2009 | Mu et al. |
| 2009/0125951 A1 | 5/2009 | Agricola et al. |
| 2009/0164641 A1 | 6/2009 | Rogers et al. |
| 2009/0172780 A1* | 7/2009 | Sukeda ............ H04N 21/41265 726/3 |
| 2009/0193466 A1 | 7/2009 | Ehreth et al. |
| 2009/0228919 A1 | 9/2009 | Zott et al. |
| 2009/0248802 A1* | 10/2009 | Mahajan ................ G06F 9/542 709/204 |
| 2009/0254827 A1 | 10/2009 | Gonze et al. |
| 2009/0259944 A1 | 10/2009 | Wu |
| 2009/0259969 A1 | 10/2009 | Pallakoff |
| 2009/0270085 A1 | 10/2009 | Jones et al. |
| 2009/0282470 A1 | 11/2009 | Yang et al. |
| 2009/0298535 A1 | 12/2009 | Klein et al. |
| 2009/0320065 A1 | 12/2009 | Sloo et al. |
| 2009/0327507 A1 | 12/2009 | Douillet et al. |
| 2010/0027974 A1 | 2/2010 | Ansari |
| 2010/0081375 A1 | 4/2010 | Rosenblatt et al. |
| 2010/0082491 A1 | 4/2010 | Rosenblatt et al. |
| 2010/0094728 A1 | 4/2010 | Denning et al. |
| 2010/0094900 A1 | 4/2010 | Hughes, Jr. |
| 2010/0137028 A1 | 6/2010 | Farris et al. |
| 2010/0138746 A1 | 6/2010 | Zarom |
| 2010/0138780 A1 | 6/2010 | Marano et al. |
| 2010/0174993 A1 | 7/2010 | Pennington et al. |
| 2010/0198860 A1 | 8/2010 | Burnett et al. |
| 2010/0205628 A1 | 8/2010 | Davis et al. |
| 2010/0208136 A1 | 8/2010 | Castano |
| 2010/0241699 A1 | 9/2010 | Muthukumarasamy et al. |
| 2010/0257569 A1 | 10/2010 | O'Hanlon |
| 2010/0265939 A1 | 10/2010 | Parlamas et al. |
| 2010/0281042 A1 | 11/2010 | Windes et al. |
| 2010/0283586 A1 | 11/2010 | Ikeda et al. |
| 2010/0313135 A1 | 12/2010 | Johnson et al. |
| 2010/0313225 A1 | 12/2010 | Cholas et al. |
| 2010/0325552 A1 | 12/2010 | Sloo et al. |
| 2011/0007901 A1 | 1/2011 | Ikeda et al. |
| 2011/0014972 A1 | 1/2011 | Herrmann et al. |
| 2011/0030020 A1 | 2/2011 | Halttunen |
| 2011/0032870 A1 | 2/2011 | Kumar |
| 2011/0035692 A1 | 2/2011 | Sandone et al. |
| 2011/0060998 A1 | 3/2011 | Schwartz et al. |
| 2011/0083157 A1 | 4/2011 | Addair |
| 2011/0084900 A1 | 4/2011 | Jacobsen et al. |
| 2011/0090898 A1 | 4/2011 | Patel et al. |
| 2011/0099516 A1 | 4/2011 | Hughes |
| 2011/0107227 A1 | 5/2011 | Rempell et al. |
| 2011/0125594 A1 | 5/2011 | Brown et al. |
| 2011/0131607 A1 | 6/2011 | Thomas et al. |
| 2011/0137729 A1 | 6/2011 | Weisman et al. |
| 2011/0138354 A1 | 6/2011 | Hertenstein et al. |
| 2011/0138429 A1 | 6/2011 | Schade et al. |
| 2011/0156879 A1 | 6/2011 | Matsushita et al. |
| 2011/0161396 A1 | 6/2011 | Filbrich et al. |
| 2011/0202466 A1 | 8/2011 | Carter |
| 2011/0214148 A1 | 9/2011 | Gossweiler, III et al. |
| 2011/0228768 A1 | 9/2011 | Gelter et al. |
| 2011/0231265 A1 | 9/2011 | Brown et al. |
| 2011/0231565 A1 | 9/2011 | Gelter et al. |
| 2011/0231566 A1 | 9/2011 | Gelter et al. |
| 2011/0267981 A1 | 11/2011 | Davies |
| 2011/0289419 A1 | 11/2011 | Yu et al. |
| 2011/0296454 A1 | 12/2011 | Xiong et al. |
| 2011/0296465 A1 | 12/2011 | Krishnan et al. |
| 2011/0314386 A1 | 12/2011 | Jeong et al. |
| 2012/0054616 A1 | 3/2012 | Mittal |
| 2012/0059875 A1 | 3/2012 | Clark |
| 2012/0059876 A1 | 3/2012 | Chinta et al. |
| 2012/0072846 A1 | 3/2012 | Curtis |
| 2012/0102209 A1 | 4/2012 | Fok Ah Chuen et al. |
| 2012/0110074 A1 | 5/2012 | Getchius |
| 2012/0110464 A1 | 5/2012 | Chen et al. |
| 2012/0114313 A1 | 5/2012 | Phillips et al. |
| 2012/0130971 A1 | 5/2012 | Morris |
| 2012/0144416 A1 | 6/2012 | Wetzer et al. |
| 2012/0151509 A1 | 6/2012 | McCarthy et al. |
| 2012/0166560 A1 | 6/2012 | Nobori et al. |
| 2012/0178426 A1* | 7/2012 | Filipov ............. G06Q 30/0267 455/414.1 |
| 2012/0182994 A1 | 7/2012 | Dec et al. |
| 2012/0185887 A1 | 7/2012 | Newell |
| 2012/0192225 A1 | 7/2012 | Harwell et al. |
| 2012/0239218 A1 | 9/2012 | Forbes, Jr. |
| 2012/0254931 A1 | 10/2012 | Oztaskent et al. |
| 2013/0014142 A1 | 1/2013 | Newell |
| 2013/0167005 A1 | 6/2013 | Corbett et al. |
| 2013/0250181 A1 | 9/2013 | Zhang et al. |
| 2014/0033198 A1 | 1/2014 | Umapathy et al. |
| 2016/0241912 A1 | 8/2016 | McCarthy et al. |

FOREIGN PATENT DOCUMENTS

| | | |
|---|---|---|
| CN | 101778198 A | 7/2010 |
| CN | 101815073 A | 8/2010 |
| EP | 0 872 987 A2 | 10/1998 |
| EP | 2 175 607 A1 | 4/2010 |
| JP | 2002-125264 A | 4/2002 |
| JP | 2004-356695 A | 12/2004 |
| JP | 2005-354321 A | 12/2005 |
| JP | 2006-525771 A | 11/2006 |
| JP | 2009-181583 A | 8/2009 |
| JP | 2010-067097 A | 3/2010 |
| JP | 2010-157790 A | 7/2010 |
| JP | 2012-506077 A | 3/2012 |
| JP | 2012-529856 A | 11/2012 |
| WO | 92/22983 A2 | 12/1992 |
| WO | 2004/100500 A2 | 11/2004 |

(56) References Cited

FOREIGN PATENT DOCUMENTS

| | | |
|---|---|---|
| WO | 2007/078745 A1 | 7/2007 |
| WO | 2008/070050 A2 | 6/2008 |
| WO | 2008/108718 A1 | 9/2008 |
| WO | 2010/151284 A1 | 12/2010 |
| WO | 2011/078879 A1 | 6/2011 |

OTHER PUBLICATIONS

Hodge, W., et al., "Video On Demand: Architecture, Systems, and Applications", SMPTE Journal, pp. 791-803 (Sep. 1993).
Honcharenko, W., et al., "Broadband Wireless Access", IEEE Communications Magazine, pp. 20-26 (Jan. 1997).
Hu, C., et al., "Mobile Media Content Sharing in UPnP-Based Home Network Environment", Journal of Information Science and Engineering 24, pp. 1753-1769 (2008).
Kerr, M., et al., "Integrated Narrowband/Broad band Access Architecture", SMPTE Journal, vol. 106, Issue 5, pp. 285-297 (May 1997).
Kuhl, C., "Serving Up A New Business", CED Magazine, pp. 1-3 (May 1999).
Kumar, B., "Access Strategies for Communication Service Providers", Technology Futures Inc., pp. 9-18 (1996).
Kwok, T., "A Vision for Residential Broadband Services: ATM-to-the-Home", IEEE Network, pp. 14-28 (1995).
Mesiya, M. F., "Implementation Of Broadband Integrated Services Distribution Network", Proceedings of SPIE, Fiber Optic Networks & Coherent Technology in Fiber Optic Systems II, vol. 841, pp. 1-14 (1987).
Paul, I., "Hands On: YouTube Leanback", PCWorld, Retrived from Internet URL : http://www.pcworld.com/article/200769/hands_on_youtube_leanback.html, pp. 6 (Jul. 2010).
Pekowsky, S., and Jager, R., "The Set-Top Box as Multi-Media Terminal", IEEE Transactions on Consumer Electronics, pp. 308-309 (1998).
Sanchez, I., et al., "Controlling Multimedia Players Using NFC Enabled Mobile Phones", 6th International Conference on Mobile and Ubiquitous Multimedia (MUM), pp. 1-7 (Dec. 2007).
Shaivitz, M., "The Web to Your TV, With a Flick of A Wrist? Slapstick Says Yes," Retrived from Internet URL: http://techcocktail.com/the-web-to-our-tv-with-a-flick-of-a-wrist-slapstick-says-yes-2010-12, on Mar. 2, 2011, pp. 2, (Dec. 10, 2010).
Steinfeldt., J., "Televisualization: Science by Satellite", Illinois Media Space, Retrieved from Internet URL : https://mediaspace.illinois.edu/media/U1_z8mbj712, accessed on May 11, 2022, pp. 11 (Dec. 9, 2015).
Woo, H. Y., and Kim, C-K., "Multicast Scheduling for VOD Services", Multimedia Tools and Applications, vol. 2, pp. 157-171 (1996).
Non-Final Office Action dated Nov. 18, 2022 in U.S. Appl. No. 17/360,953, 19 pages.
Non-Final Office Action dated Jan. 26, 2023, in U.S. Appl. No. 17/962,654, 25 pages.
"AnyRemote", Retrieved from Internet URL: http://anyremote.sourceforge.net/, pp. 2, accessed on Feb. 6, 2014 (2013).
"Audiovisual Multimedia Services: Video on Demand Specification 1.0", The ATM Forum Technical Committee, pp. 1-36 (Dec. 1995).
"Best way to generate Random, Unique Session ID's", vBulletin, Nov. 19, 2011, p. 1.
"Best way to generate Random, Unique ID's", vBulletin, Internet Archive Wayback Machine, on Nov. 19, 2011, p. 1 (Jan. 2009).
"Control television phone", Retrieved from Internet URL: http://www.bing.com/search ?q=control+television+phone&go=Submit+Query &qs=bs&for, Feb. 6, 2014, pp. 3.
"Control television server phone", Retrieved from Internet URL: http://www.bing.com/search?q=control+television+server+phone &qs=n&form=QBLH&pq, accessed on Feb. 6, 2014, p. 1.
"Mobile device server display device", Retrieved from Internet URL: http://www.ask.com/web?q=mobile+device+server+display+device&qsrc=0&o=0&l=dir, on Jul. 30, 2012, pp. 2.

"Mashable—10 Mobile Apps to Control Your TV", Retrieved from Internet URL: http://mashable.com/2012/11/28/apps-control-tv/, Nov. 28, 2012, pp. 102.
"Mobile Phone Television Remote Control", Retrieved from Internet URL: http://www.fileguru.com/apps/mobile_phone_television_remote_control_app, pp. 5 (2013).
"Mobile server television control", Retrieved from Internet URL: http://www.bing.com/search ?q=mobile+server+television+control &qs=n&form=QBLH&p, Jun. 26, 2014, p. 1.
"Mobile server television control media player", Retrieved from Internet URL: http://www.bing.com/search ?q=mobile+server+television+control+media+player&q s=n&f, Jun. 26, 2014, p. 1.
"Phone Server television control", Retrieved from Internet URL: http://www.bing.com/search?q=phone+server+television+control &qs=n&form=QBRE&p, Jun. 26, 2014, p. 1.
"Phone server television control media player", Retrieved from Internet URL: http://www.bing.com/search?q=phone+server+television+control+ media+player&qs=n&f, Jun. 26, 2014, p. 1.
"Session identifier random", Ask.com, Nov. 19, 2011, p. 1.
"Session cookie", Webopedia Computer Dictionary, Nov. 19, 2011, pp. 3.
"Snapstick", Snapstick—Home, Retrieved from Internet URL : http://www.snapstick.com/, on Dec. 12, 2019, pp. 2, (Mar. 2011).
"Smartphone Remote Control Apps Boxee Support", Retrieved from Internet URL: http://support.boxee.tv/entries/20771358-smartphone-remote-control-apps, on Feb. 6, 2014, pp. 2 (Dec. 2011).
"Time-shared, Interactive, Computer Controlled Information Television (TICCIT)", Mitre Corporation, Retrieved from Internet URL : https://en.wikipedia.org/wiki/TICCIT, accessed on May 5, 2022, pp. 2.
"Using AirPlay", Retrieved from Internet URL : https://web.archive.org/web/20101129073434/http://support.apple.com/kb/HT4437, pp. 2 (2011).
Using the Play To feature to stream media, Retrieved from the Internet URL : http://windows.microsoft.com/en-us/windows7/using-the-play-to-feature-to-stream-media, pp. 3 ( Jun. 2011).
"User session", Webopedia Computer Dictionary, Nov. 19, 2011, pp. 3.
"Web identifier", Webopedia: Online Computer Dictionary for Internet Terms and Technical Support, Retrieved from Internet URL : http://www.webopedia.com/gsearchJresults?cx=partner-pub-8768004398756183%3A676, on Nov. 19, 2011, pp. 3.
"You Tube—Leanback", Retrieved from Internet URL : https://www.youtube.com/watch?v=bITse42LpKA, p. 1 (2010).
"Yahoo!7 TV Guide", Retrieved from the Internet URL : http://itunes.apple.com/au/app/yahoo-7-tv-guide/id424719922?mt=8, pp. 2 (2011).
Balabanian, V., et al., "An Introduction to Digital Storage Media—Command and Control (DSM-CC)", IEEE Communications Magazine, pp. 1-15 (1996).
Balabanian, V., et al., "Digital Storage of Media-Command and Control Protocol Applied to ATM", IEEE Journal on Selected Areas in Communications, vol. 14, No. 6, pp. 1162-1172 (Aug. 1996).
Chang, Y-H., et al., "An Open-Systems Approach to Video on Demand", IEEE Communications Magazine, pp. 68-80 (May 1994).
Cheng, J., "Stream AirPlay video to regular TV? Apple might make it happen", Retrieved from Internet URL : http://arstechnica.com/apple/news/2011/03/stream-airplay-video-to-a-regular-tv-apple-might-make-it-happen/, on Dec. 12, 2019, pp. 5 (Mar. 2011).
Dolcourt, J., et al., "Snapstick takes on Apple TV, Google TV," Retrieved from Internet URL : https://www.cnet.com/news/snapstick-takes-on-apple-tv-google-tv/, Dec. 9, 2010, pp. 3.
Fallahkhair, S., et al., "Dual Device User interface Design for Ubiquitous Language Learning: Mobile Phone and Interactive Television (iTV)", Proceedings of the 2005 IEEE International Workshop on Wireless and Mobile Technologies in Education,pp. 8 (2005).
Foley, J. D., et al., "Effective Software Systems for Scientific Data Visualization", SIGGRAPH, Panel Proceedings, pp. 111-136 (1989).
Fukuoka, H., and Mizuno, H., "A Multimedia Integration Trial for Groupware with Video-on-Demand", IEEE International Workshop on Community Networking, pp. 97-102 (1996).

(56) References Cited

OTHER PUBLICATIONS

Furht, B., et al., "Design Issues for Interactive Television Systems", Computer, IEEE, vol. 28, No. 5, pp. 25-39 (May 1995).
Haber, R. B., et al., "Eliminating Distance in Scientific Computing: An Experiment in Televisualization", The International Journal of Supercomputer Applications, vol. 4, No. 4, pp. 1-19 (1990).
Hachman, M., "Snapstick's Media Streaming App/Box: Hands On", Retrieved from Internet URL : https://uk.pcmag.com/news/102838/snapsticks-media-streaming-appbox-hands-on, on Dec. 12, 2019, pp. 2 (Jan. 2011).
Non-Final Office Action dated May 12, 2023, in U.S. Appl. No. 18/107,088, 24 pages.
Final Office Action dated Jun. 5, 2023 in U.S. Appl. No. 17/962,654, 31 pages.
Final Office Action dated Apr. 28, 2023 in U.S. Appl. No. 17/360,953, 22 pages.
Non-Final Office Action dated Jun. 9, 2023, in U.S. Appl. No. 18/107,076, 26 pages.
Final Office Action dated Sep. 20, 2023 in U.S. Appl. No. 18/107,088, 29 pages.
Non-Final Office Action dated Sep. 14, 2023, in U.S. Appl. No. 18/107,081, 26 pages.
Non-Final Office Action dated Aug. 17, 2023, in U.S. Appl. No. 17/360,953, 24 pages.
Final Office Action dated Oct. 2, 2023 in U.S. Appl. No. 18/107,076, 29 pages.
Notice of Allowance dated Oct. 6, 2023 in U.S. Appl. No. 17/962,654, 15 pages.

\* cited by examiner

| Transmission Code | | | | |
|---|---|---|---|---|
| UserID | TargetID | MediaPlayerID | Command | Data |

FIG. 3

| Single Connection Look-up Table | |
|---|---|
| Display Device | User - Smartphone |
| 2 | A |
| 1 | C |
| 3 | D |
| 4 | B |

| Universal API Adapter | | |
|---|---|---|
| Universal Command | MediaPlayerID | Specific Player Command |
| New Video | YouTube | yt_loadVideo |
| | Ted.com | getVideo |
| | Vimeo | loadNewVideo |
| Pause | YouTube | yt_pauseVideo |
| | Ted.com | pauseVideo |
| | Vimeo | pause |

FIG. 5

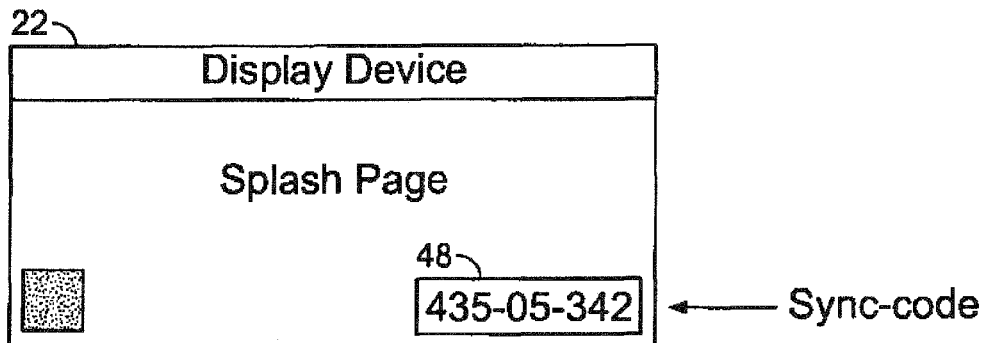
FIG. 7A
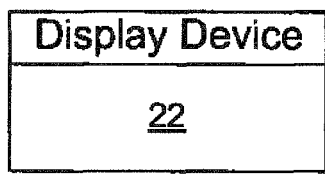
FIG. 7B
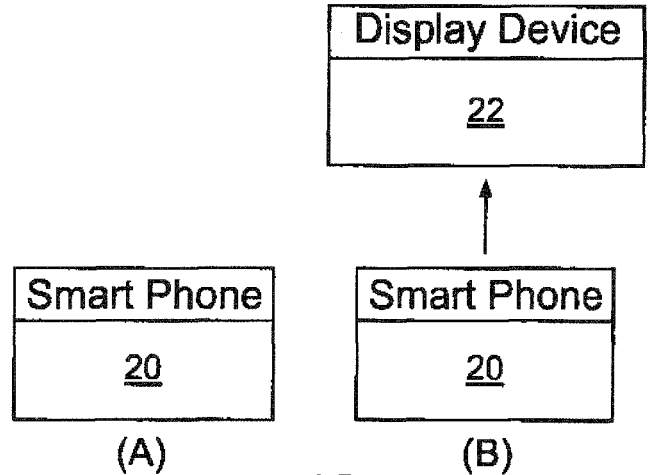
FIG. 8
FIG. 9

PLAY CONTROL OF CONTENT ON A DISPLAY DEVICE

CROSS-REFERENCE TO RELATED APPLICATIONS

The present application is a continuation of U.S. application Ser. No. 17/396,446, filed Aug. 6, 2021, which is a continuation of U.S. application Ser. No. 16/917,095, filed Jun. 30, 2020, which is a continuation of U.S. application Ser. No. 15/687,249, filed Aug. 25, 2017, which is a continuation of U.S. application Ser. No. 13/532,546, filed on Jun. 25, 2012, which is a continuation-in-part of U.S. application Ser. No. 13/157,821, filed on Jun. 10, 2011, which issued on Dec. 2, 2014 as U.S. Pat. No. 8,904,289, which claims the benefit of priority to U.S. Provisional Patent Application No. 61/477,998, filed on Apr. 21, 2011. The contents of the earlier applications are incorporated herein by reference.

BACKGROUND

This disclosure relates to play control of content on a display device. Such display devices include, for example, television displays used by consumers in their home for viewing videos and other media that are either provided from the Web or previously stored. In particular, the disclosure relates to the creation, storage, manipulation and access of media playlists used in conjunction with display devices and control of the display devices.

Web media often is played on computers rather than television displays. Although it is known to connect a computer to a television set in order to watch Web media, it is difficult to control such a system within the typical scenario for television watching where the viewer is positioned some distance from the television. Furthermore, although a wireless device can enable the user to control the television from a distance, it can be difficult to view a web browser display on the television set and may interfere with normal television program viewing by other persons.

Given the desire to watch various World Wide Web media on a family's primary television set, and to control this operation from the comfort of one's couch, there is a need to operate a television set or other display remotely from a personal computing device, such as a mobile phone. It also is desirable to allow a user to perform a general Web search to locate and capture Web media, and to control a television or other display remotely using the personal computing device.

SUMMARY

Various aspects of the invention are set forth in the claims.

For example, according to one aspect, a system for presenting and controlling content on a display device includes a network, a server system coupled to the network and comprising one or more servers, a display device coupled to the network and having a display, and a personal computing device operable to transmit a first message according to a specified format over the network to the server system. The server system stores an association between the personal computing device and the display device. The first message identifies user-selected content and a media player to play the content. The server system is operable, in response to receiving the first message from the personal computing device, to provide to the display device a second message identifying the user-selected content and the media player to play the content. In response to receiving the second message, the display device is operable to obtain a first media player needed to play the content, to load the media player and to present the content on the display.

In some implementations, the display device is operable, in response to receiving the second message, to obtain the first media player from the content provider only if the first media player is not already loaded in the display device.

In some implementations, the personal computing device is operable to transmit a message according to a specified format over the network to the server system. The message can include a command for controlling playing of the content on the display device. The server system is operable, in response to receiving the message, to convert the command into a corresponding command recognizable by the media player if the command received from the personal computing device is not recognizable by the media player. The server system is operable to provide to the display device a message that includes the corresponding command, and the display device is operable, in response to receiving the message from the server system, to execute the command.

In some implementations, the personal computing device is, for example, a mobile phone, and the display device is a television set. Other personal computing devices or display devices can be used in other implementations. The network can include, for example, the Internet.

In some implementations, the server system stores a look-up table that includes a synchronization code uniquely associated with the display device. A message from the personal computing device can include the synchronization code, and in response to receiving the message from personal computing device, the server system can use the synchronization code and the look-up table to identify the display device on which the content is to be played. The synchronization code can be different from an IP address associated with the display device and/or a media access control address associated with the display device.

In various implementations, the system can facilitate allowing a personal computing device to be used to select different content to be played on a remote display even if different media players are required to present the different content. The system also can allow the user to control how the content is displayed on the display device using the personal computing device. For example, user-initiated play commands can be passed from the user's personal computing device, through the server system, to the display devices.

Other aspects, features and advantages will be apparent from the following detailed description, the accompanying drawings, and the claims.

BRIEF DESCRIPTION OF THE FIGURES

The present technology is illustrated by way of example, and not by way of limitation, in the figures of the accompanying drawings.

FIG. 3 illustrates an example of a transmission code incorporated into a message from a personal computing device.

FIG. 4 illustrates an example of a look-up table that forms part of a server system.

FIG. 5 illustrates an example of entries in a universal API adapter.

FIG. 7A illustrates an example of a display device including a synchronization code.

FIG. 7B illustrates an example of a synchronization code look-up table.

FIGS. 8-13 illustrate examples of various scenarios in which the invention can be used.

FIG. 15 illustrates further information that can be stored in the look-up table in the server system.

DETAILED DESCRIPTION

Figure 1:
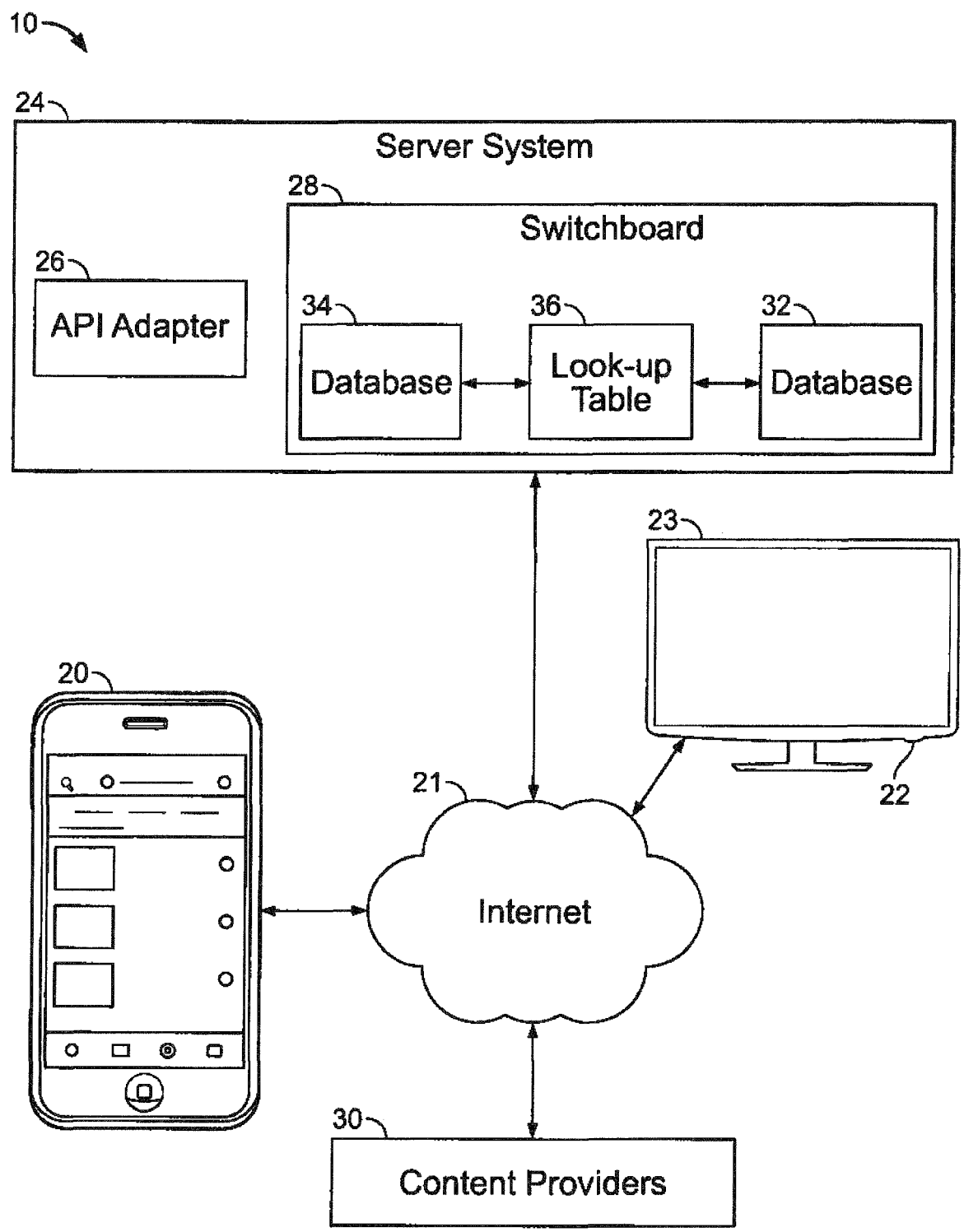
FIG. 1 is a block diagram illustrating an example of a system according to the invention.

As shown in FIG. 1, a system 10 facilitates synchronizing a connection between two or more devices 20, 22 connected to the Internet 21 or other computer network. The connection is designed to be made by a first device (e.g., a personal computing device) 20 that acts as a controller and a second device (e.g., a television set 22 with a display 23) that acts as a receiver to play content selected by a user of the first device and to respond to commands that originate at the personal computing device. The personal computing device 20 is operable to display an application or web site that contains information and links to content providers 30 on the Internet 21. The television set 22 is operable to link back to a server system 24 from which the television set receives commands. When a user makes a selection using the personal computing device 20 for particular content to be displayed on the television display 23, a signal is sent through the Internet (or other network) 21 to the server system 24. A corresponding command signal then is passed along to the connected television set 22, which acts on a transmission code contained within the signal and performs specified commands. For example, in some scenarios, the command instructs the television set 22 to access a content provider 30 through the Internet 21, load a specific media player, load the media player-specific content (e.g., a video) and play the content on the television display 23. The user can use the personal computing device 20 to control how the content is played on the television display 23. The user may subsequently visit the same or another Web site using the personal computing device 20 to select different content (e.g., a second video) to be played on the television display 23. In that case, another signal would be sent through the server system 24 to the television set 22. A transmission code associated with this command signal instructs the television set 22 to load a new media player (if needed) over the Internet and to load the specified video file to be played on the display 23. Thus, the system 10 allows a personal computing device 20 to be used to select different content to be played on a remote display 23 even if different media players are required for the different content. The user also can control how the content is displayed (e.g., play, pause, stop, rewind, fast forward, etc.) on the display 23 using the personal computing device 20. The user-initiated play commands are passed from the user's personal computing device 20, through the server system 24, to the television set 22.

Although the following detailed discussion describes videos as an example of the type of content to be played on the display 23, the system 10 can be used for other types of content as well. Thus, depending on the implementation, the content may include one or more of the following: video, audio, interactive video game, streaming media, multimedia, images, slides (e.g., a PowerPoint presentation) or other types of dynamic content. Furthermore, in the following discussion, it is assumed that the personal computing device 20 is a mobile phone that includes a display, an internal microprocessor or other processing circuitry, a keypad, keyboard, touchscreen, mouse, trackball, or other device to receive user selections and other input, and a transceiver to establish communications to the Internet 21 or other communications networks. More generally, however, the personal computing device 20 can be any type of handheld or other Internet-enabled personal computing device, including personal computers, e-books, kiosks, tablets, smart phones, media players, and motion and touch sensory interfaces. In some cases, input from the user can be received in forms other than tactile input (e.g., acoustic or speech).

Figure 2:
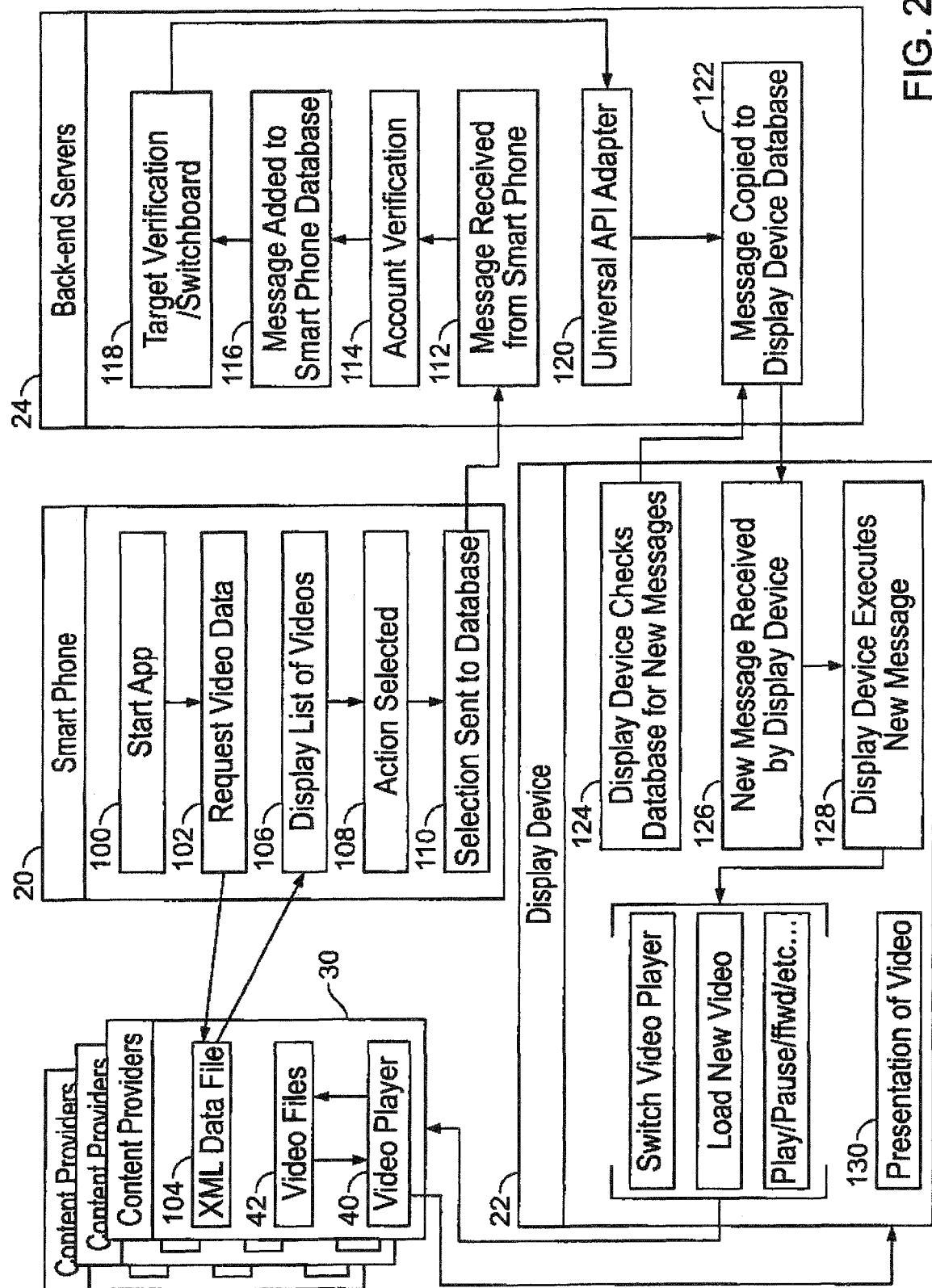
FIG. 2 illustrates various details of the flow of information and signals according to some implementations.

FIG. 2 illustrates further details of the flow of information and signals according to some implementations. The personal computing device (e.g., mobile phone) 20 is operable to display an application or web site that contains information and links to content providers 30 on the Internet 21. The user operates the mobile phone 20 so as to start the application or access the web site (block 100). In some implementations, a logo appears on the mobile phone's display. By selecting the logo, the user causes a menu to expand and present various options. The options can include, for example: (i) add new content to a playlist, (ii) play a listed item on a secondary device, (iii) play a listed item on the mobile phone 20. If the user selects to add new content to the playlist, the user is presented with a screen that allows him to enter user-defined search parameters or o select pre-defined search parameters to request video data. The search parameters are sent from the mobile phone 20 as part of a request for video data that satisfy the search parameters (block 102). The request is transmitted via the Internet 21 and through the server system 24 to the appropriate content provider web site. In response, the content provider 30 provides metadata (e.g., titles, links to the videos) for one or more video files that satisfy the search parameters (block 104). The metadata can be provided to the mobile phone 20, for example, in the form of an XML data file. Upon receiving the data file, the mobile phone 20 displays a list of one or more videos based on the information received from the content provider 30 (block 106).

If desired, the user can take one of several actions, including selecting one of the videos from the displayed list to be played on the television display 23 or initiating a command with respect to a video that already has been loaded to the television set 22 (block 108). The mobile phone 20 then formats and transmits a message to the server system 24 (block 110). The message from the mobile phone 20 contains a transmission code that includes data regarding the user information (e.g., user identification or account number), the secondary display it wants to connect to (e.g., television set 22 with display 23), the location and name of the media player for the selected video, the command (e.g., play, pause, rewind, etc.), and the video file to be acted upon. An example of the format of a transmission code from the mobile phone 20 to the server system 24 is illustrated in FIG. 3. Different formats and/or different information may be appropriate for other implementations.

The message from the mobile phone 20 is transmitted over the Internet 21 and is received by the server system 24 (block 112). Based on information in the message from the mobile phone 20, the server system 24 verifies that the user has an account (block 114), and the contents of the message, as well as the date and time of receipt of the message, are added to a personal computing device database 32 (block 116) which forms part of a switchboard 28. In general, all messages from a particular user's personal computing device 20 are stored in the database 32 corresponding to an account for the particular user. Thus, the database 32 stores a record of all messages received from a user's personal computing device 20, as well as the user's identification, an indication of the target device 22, an identification of the media player that is required for the selected video, and an identification of the selected video.

The switchboard 28 also includes a look-up table 34 that stores a correspondence between a particular personal computing device (such as mobile phone 20) and target devices (e.g., the television set 22) to which the user command is directed. An example of the look-up table 28 is illustrated in FIG. 4. In this example, it is assumed that, at most, a single connection is established at any given time between a particular mobile phone and a display device. However, as explained below, other scenarios are also possible to establish group connections (e.g., multiple mobile phones connected to the same display device). The server system 24 performs a target verification (block 118), which includes checking whether a connection to a particular display device already is established for the mobile phone 20 and, if so, checking the identification of the display device. During the target verification, if the look-up table indicates that there is no connection established between the mobile phone 20 and a particular display device, then the server system 24 sends a message to the mobile phone 20 to prompt the user to identify the device on which the video is to be displayed.

A user can identify the device on which the video is to be displayed in one of several ways, depending on the implementation. In some implementations, the user can select the display device from a list of devices displayed on the mobile phone 20. The list can include a field populated with names or identifications of display devices that previously have been initialized for connection. Alternatively, the user can select the display device by entering a synchronization code uniquely associated with the particular display device. As illustrated in FIG. 7A, the synchronization code 48 can be displayed, for example, on a splash page of the display device as text on the screen or as an image such as a QR code and can be entered into the mobile phone 20, for example, manually by the user or by scanning the code into the mobile phone. The code can be scanned, for example, using optical scanning or RFID techniques. Preferably, the synchronization code is different from the IP address associated with the device 22. The IP address also can be different from the media access control (MAC) address associated with the device 22. For example, in some implementations, the synchronization code is generated randomly and assigned to the display device 22 each time it connects to the server system 24. Thus, a particular display device 22 may have an IP address, a MAC address, a web or browser cookie, and a synchronization code ("sync code") assigned to it at any given time. This information can be stored, for example, in a look-up table in the server system 24. An example of entries in such a look-up table are illustrated in FIG. 7B.

Once the synchronization code is entered into, or captured by, the mobile phone 20, it is sent from the mobile phone 20 to the server system 24, which stores the information in the look-up table 36 so as to establish a connection between the mobile phone 20 and the display device 22 through the server system 24.

Once a connection is established between the mobile phone 20 and the display device 22, signals sent from the mobile device 20 to its associated database 32 are copied to a database 34 associated with the target device (e.g., television set 24) based on the correspondence between the mobile device and the target device listed in the look-up table 36 (block 122). Thus, the database 32 entries associated with a particular display device (e.g., television set 24) provide a record of the messages received for that display device, as well as an indication of the identification of the device that sent each message, an indication of the media player required to play the video, and an indication of the selected video.

In the illustrated implementation, the command in the transmission code (see FIG. 3) contains a JavaScript reference to control the media player needed to play the selected video. Various types of video players may use different JavaScript commands to control their respective playback. Therefore, in the illustrated implementation, a universal adapter 26 is provided to interpret and convert a standard or universal command (e.g., play, pause, etc.) into the specific command recognized by the media player. Each time a signal is received from the mobile device 20, the API adapter 26 checks and identifies the specific media player that is being requested. Based on this information, the system loads the appropriate set of protocols or application programming interfaces (APIs) from its library and converts the incoming commands from the mobile device 20 into the correct JavaScript (or other programming) code used by the target device 22 to control the specific player (block 120). The server system 24 then copies the converted version of the message to the database 34 associated with the target device 22, as indicated above in connection with block 122.

The universal adapter 26 can be implemented, for example, as a look-up table. Examples of entries in such a look-up table are illustrated in FIG. 5. Thus, for a universal command "New Video," the universal adapter 26 provides the corresponding command for each of several specific media players (e.g., "yt_loadVideo" for YouTube). Similarly, for a universal command "Pause," the universal adapter 26 provides the corresponding command for each of several specific media players (e.g., "pauseVideo" for Ted-.com). Other universal commands and the corresponding command(s) for one of more media players also can be stored by the universal adapter 26.

The display device 22 periodically checks the entries in the database 34 to determine if there are any new messages/ commands directed to it (block 124). For example, in some implementations, the display device 22 polls the associated database 34 at some predetermined time interval. In some implementations, instead of the display device 22 periodically checking whether there are any messages for it in the database 34, the server system 24 can push the messages to the display device 22. In any event, the system is arranged so that the display device 22 receives the messages intended for it.

Figure 6:
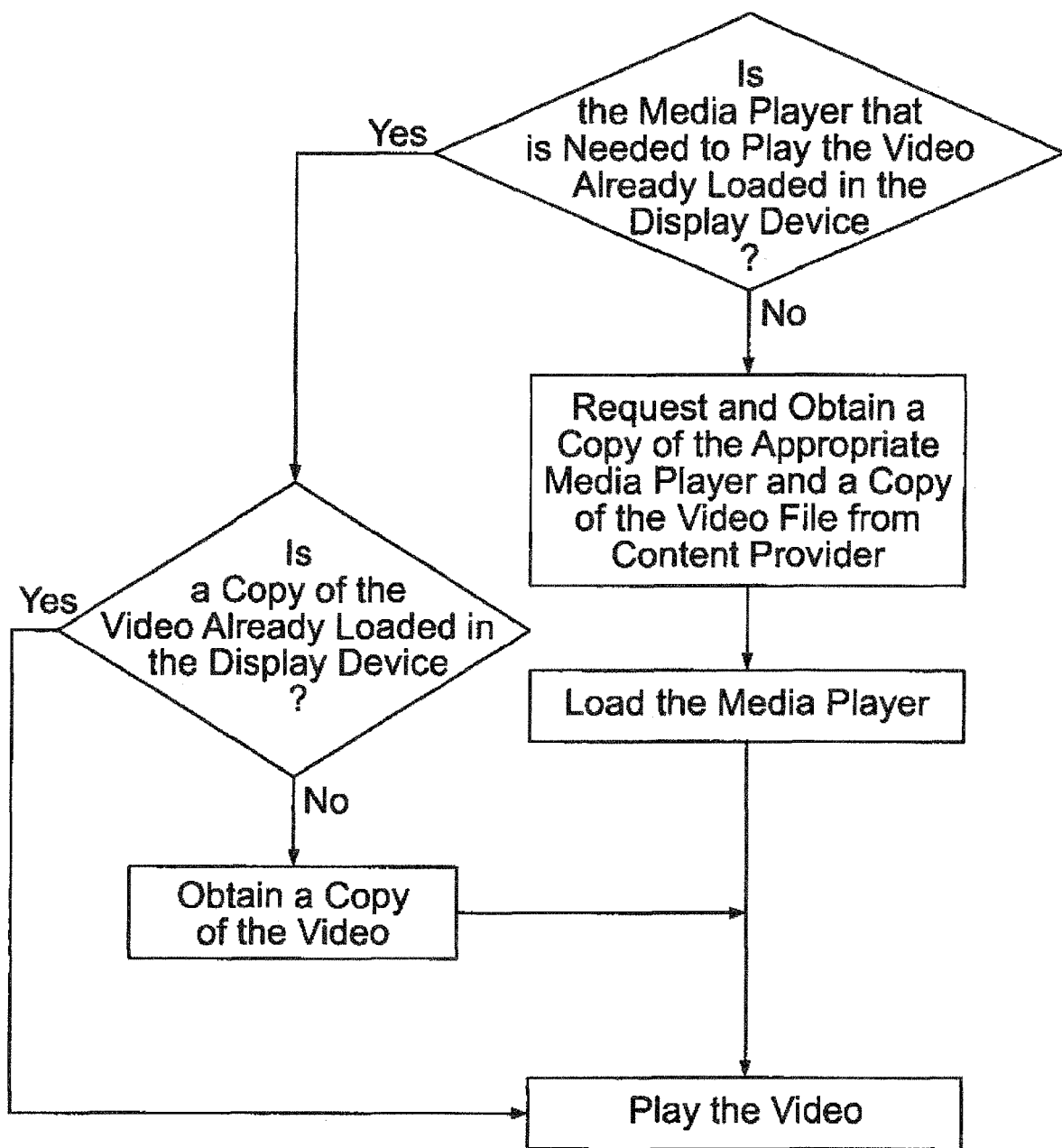
FIG. 6 is a flow chart showing steps for display device to load a video player and video.

When the display device 22 receives a message from the server system 24 (block 126), the display device executes the message (block 128). In some cases, the media player required to play the video indicated in the message is not presently loaded in the display device 22. For example, the received command may be to "play" a particular video. As indicated by FIG. 6, if the media player needed to play the video is not already loaded in the display device 22, the display device 22 requests and obtains a copy of the appropriate media player 40 and a copy of the video file 42 from a content provider 30, loads the media player and then presents the video on the display 23 (FIG. 2, block 130). Likewise, as indicated by FIG. 6, if the appropriate media player already is loaded in the display device, but the particular video is not, then the display device 22 requests and obtains a copy of the video file 42 from the content provider 30 and proceeds to play the video. To allow the display device 22 to switch between different video players (i.e., to load and unload different video players), a software program can be stored on the display device and/or the web site to establish a secure connection back to the server system 24.

Once the video is playing on the display device 22, the user of the mobile phone 20 can control the playing of the video by entering appropriate commands (e.g., pause, fast forward, rewind, stop, play, etc.) through the mobile phone. Each command is incorporated into a message including a transmission code (FIG. 3) as described above. The message is transmitted to the server system 24, which copies the message into database entries associated with the particular display device 22 (i.e., after performing any conversion of the command by the API adapter 26). Once the message is retrieved by or sent to the display device 22, the display device proceeds to execute the command.

The system and methods described here allow a user of a mobile phone or other personal computing device to create a playlist based on videos (or other types of content) from multiple sources and to play back each video using a single interface that can be used to control different media players.

As mentioned above, the system and methods described above also can be used with types of content other than video. In that case, different types of user-initiated commands may be available to control the content displayed on the display 23. For example, for interactive video games, the user-initiated commands can include control commands appropriate for the particular game.

Although the implementation of FIG. 1 illustrates the display device 22 as a television set with a display screen 23, other types of display devices can be used as well (e.g., a laptop or personal computer).

Figure 14C:
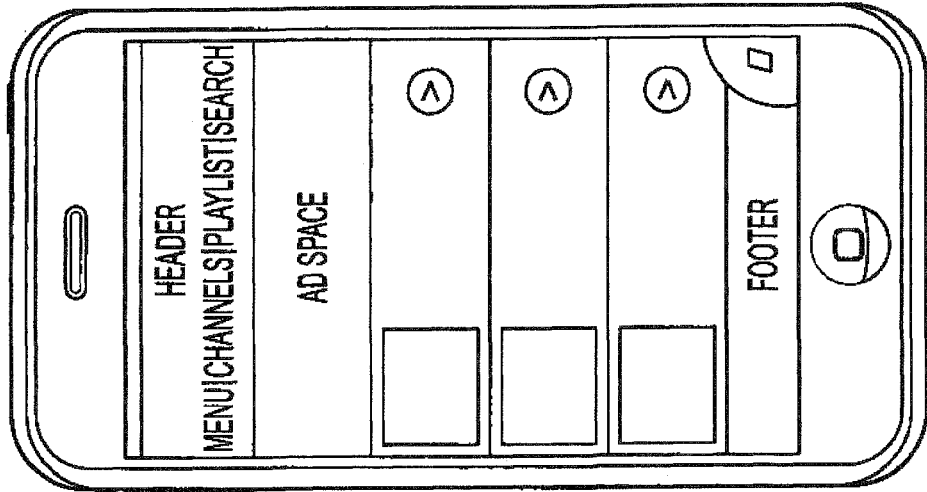
FIGS. 14A through 14E illustrate examples of display screens that may appear on a user's personal computing device in accordance with the invention.
Figure 14B:
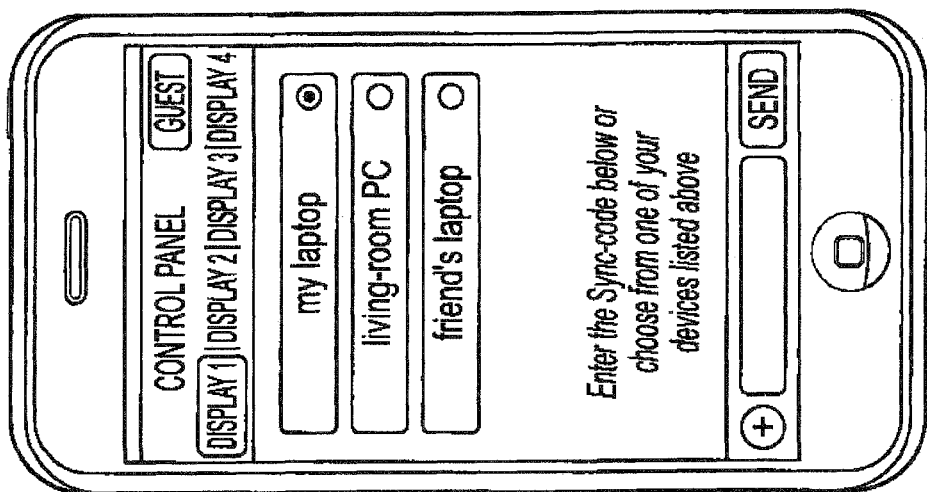
Figure 14A:
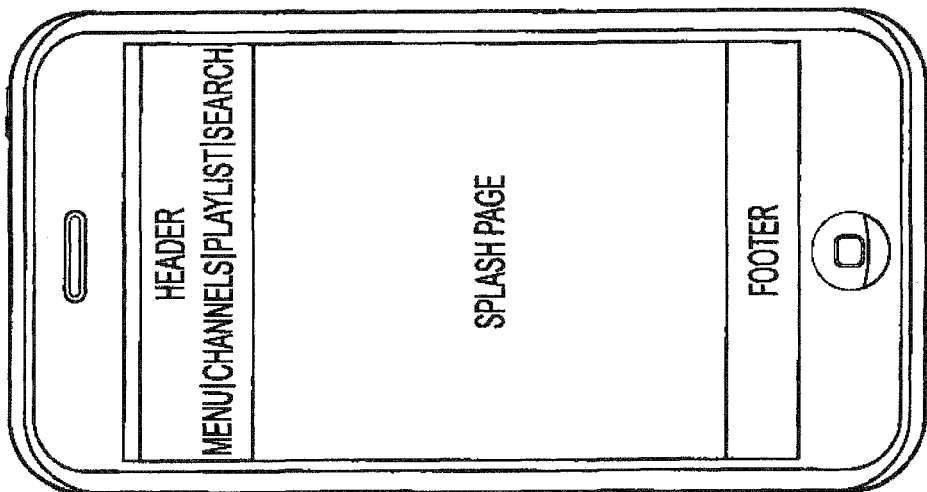

The systems and methods can be used in various scenarios to play back videos (or other content). Examples of several scenarios that can be implemented using the system described above are described in the following paragraphs. For example, a first scenario involves a single user's smartphone connecting to a single display device (FIG. 8). In this scenario, the user turns on, for example, her display device (e.g., personal computer with a display monitor), opens up a browser and accesses a website associated with the server system 24. The user then clicks on a link that launches the software program to establish a secure connection back to the server system 24. The software program opens a splash page (see FIG. 14A), and a sync-code is displayed on the monitor. The user then opens the appropriate application on her smartphone. In the smartphone application, the user accesses a "Connect" screen from which he can select one of several listed display devices (see FIG. 14B). Alternatively, the user can enter the sync-code displayed on the computer monitor (see FIG. 14B). The user then clicks on a SEND button which causes a message including the sync-code to be sent the server system 24. In response, the server system 24 establishes a connection between the user's smartphone and the selected display device through a look-up table as described above with respect to FIG. 4. The user can use a search tool in the smartphone application to find a video. In response to the search, a list of videos satisfying the search appears on the smartphone (see FIG. 14C). When the user selects a video from the list displayed on the smartphone, the information is provided through the server system 24 to the personal computer. In some implementations, a pop-up window may appear on the smartphone listing one or more options for the user to take regarding the selected video. Such options can include, for example, play the video on the selected display device (e.g., the personal computer), play the video on the smartphone, or add the video to the playlist on the smartphone. If the user chooses to have the video played on the display device (e.g., the personal computer), the personal computer obtains a copy of the required video player and the selected video from an appropriate content provider over the Internet and begins to play the video on the monitor as described previously. In some implementations, a message is displayed on the user's smartphone indicating that the selected video is playing and providing additional information about the selected video (see FIG. 14D). The user can control playing of the video (e.g., pause, fast forward, rewind, play, etc.) from her smartphone.

A second scenario involves saving a selected video to a playlist on a single user's smartphone, and subsequently playing the video on a display device (FIG. 9). In this scenario, the user opens the appropriate application on his smartphone and searches for videos using the search tool displayed in the application. When a list of videos is displayed on the smartphone in response to the search request, the user selects one or more videos to add to his playlist. At that time, or at a later time, the user can connect to a display device through the server system 24. To do so, the user opens the playlist on his smartphone and selects a video. The information is provided through the server system 24 to the display device, which obtains a copy of the required video player and the selected video from an appropriate content provider over the Internet and begins to play the video. The user can control playing of the video (e.g., pause, fast forward, rewind, play, etc.) from his smartphone.

Figure 10:
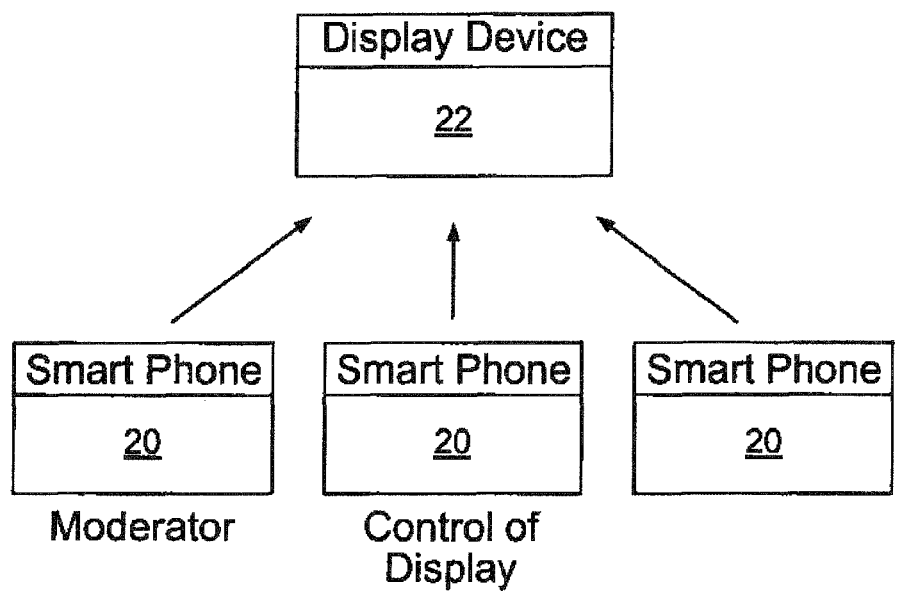
Figure 14E:
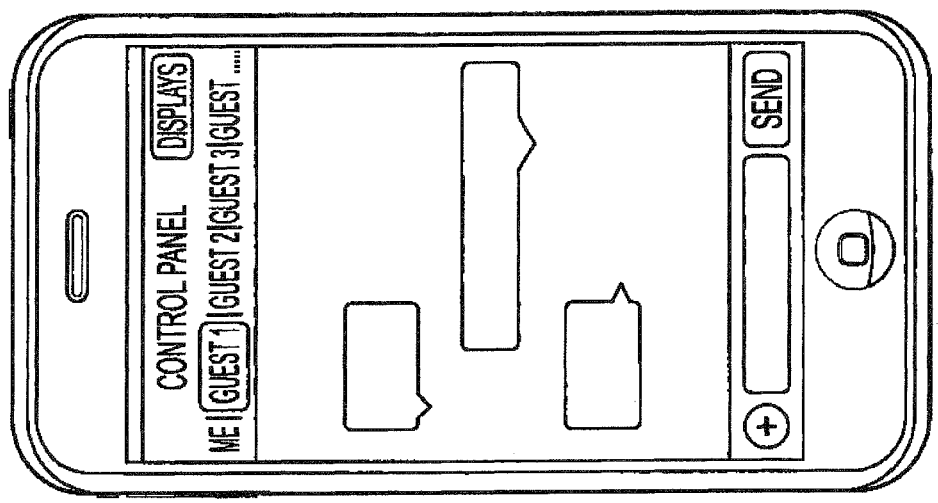
Figure 14D:
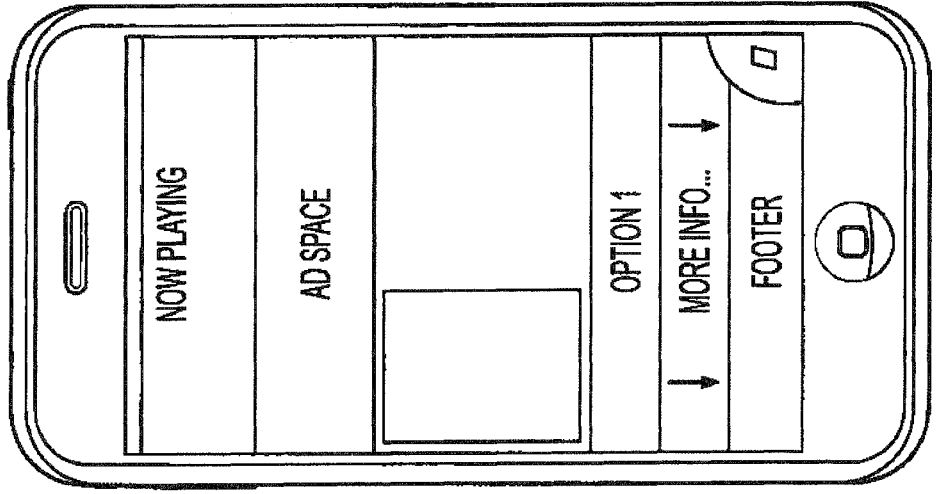

A third scenario involves multiple users' smartphones and a single display device (FIG. 10). For example, a user may want to share and watch videos with a group of friends watching together on a single display device. In this situation, the user can access the application or web site to set up a group and serve as the moderator for the group. The user then can send out a request to other members of the group, or other users can send a request to the moderator to join the group. Users can search for other users based, for example, on username or from a contact list. The moderator then can select a user in the group to control the display device. FIG. 14E illustrates an example of a screen on the user's smartphone that allows the user to connect with other users to form a group and to select which member of the group controls the display device (e.g., by selecting a member of the group from the list "Me, Guest 1, Guest 2, . . . " near the top of the screen). Alternatively, the moderator can set it up so that control is passed to each member of the group in turn automatically, or so that the next turn can be determined by consensus of the entire group, via some form of voting. Regardless of who has control of the display device 22, each user in the group retains control of his own smartphone. The look-up table 36 in the server system 24 stores the connections established between the personal computing devices of the users in the group and the display device (see FIG. 15).

Figure 11:
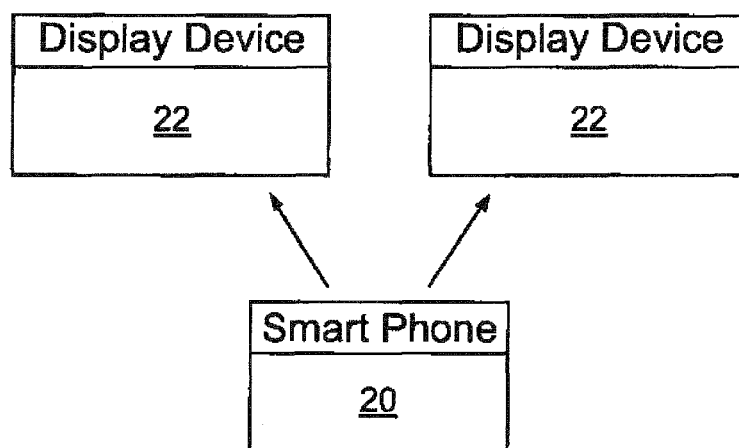

A fourth scenario involves one user's smartphone and multiple display devices (FIG. 11). In this example, a user opens the application on his smartphone to establish a connection to a first display device and then repeats the process for multiple display devices. A list of devices that the user's smartphone is connected to is displayed on the smartphone. The user can choose to control all devices simultaneously or one at a time. To do so, the user selects from the list the display device(s) he wants to control. The user then can search for videos using his smartphone. In response to the user selecting a particular video, the selected video is played on the selected display device(s).

Figure 12:
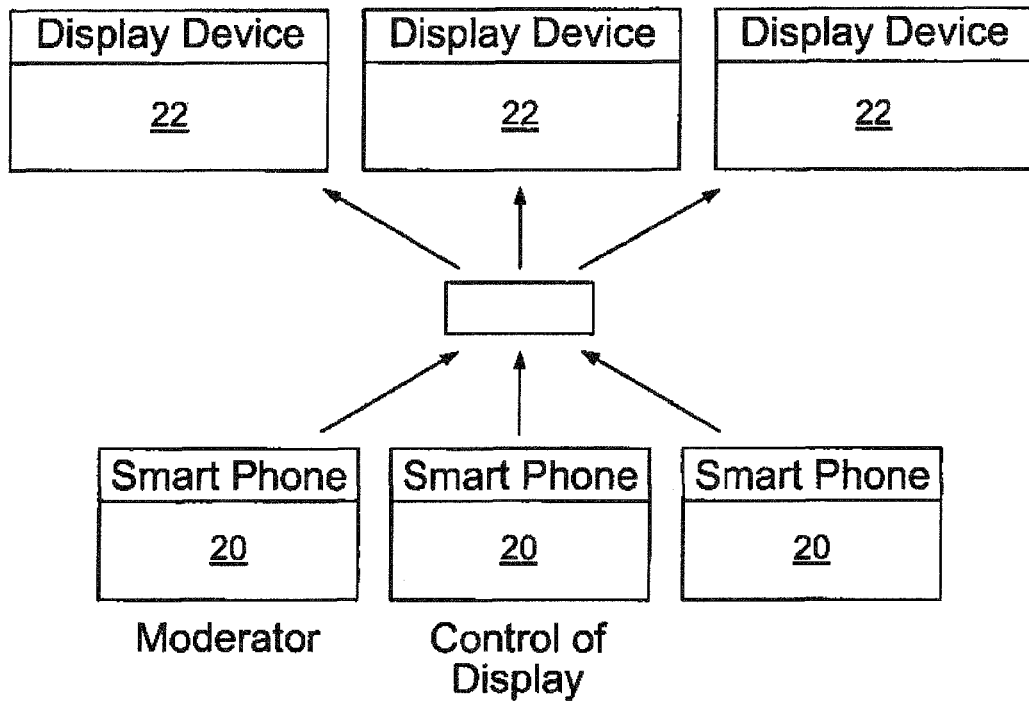

A fifth scenario involves multiple users' smartphones and multiple connected display devices (FIG. 12). For example, a user may want to share and watch videos with a group of friends, who may be in different locations each of which has a separate display device. Each user establishes a connection from her smartphone to the display device where she is located. One of the users uses the application or web site to establish a group, with the user who establishes the group serving as the group moderator. The user can send out a request to other users to join the group or other users can send a request to the moderator to join the group. In some implementations, users can search for other users based on username or from a contact list. The moderator chooses which member of the group has control of the display device. Alternatively, the moderator can set it up control is passed to each member of the group in turn automatically, or so that the next turn can be determined by consensus of the entire group, via some form of voting. The signal sent from the smartphone of the group member who has control is sent (via the server system 24) to all display devices within the group. Regardless of which group member has control of the display devices, each user retains control of her own smartphone. The look-up table 36 in the server system 24 stores the connections established between the personal computing devices of the users in the group and the display devices (see FIG. 15).

Figure 13:
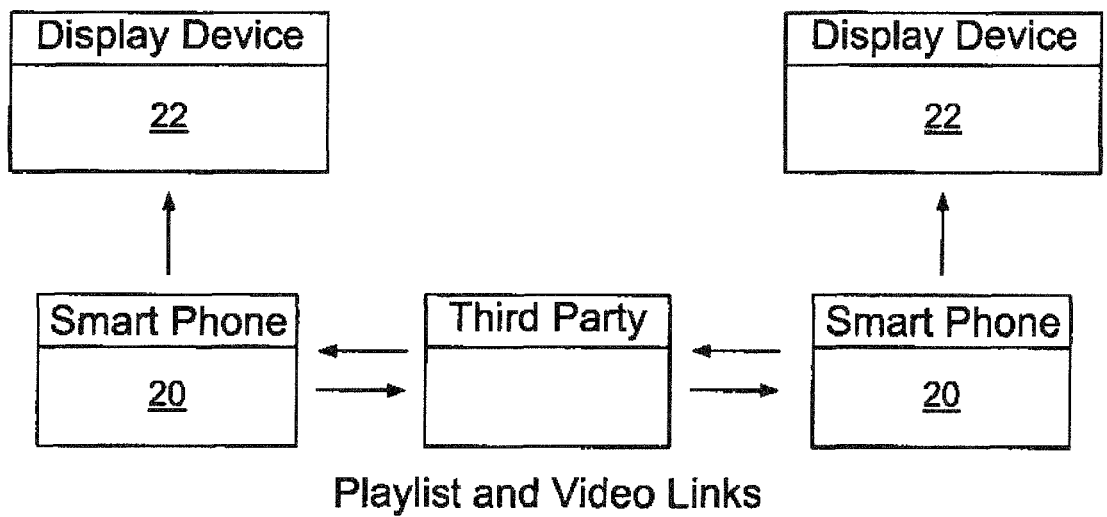

A sixth scenario involves sharing video links and a playlist (FIG. 13). For example, a user within a group can share a video playlist and video links via an Instant messaging system built-in to the application. Users also can post video links or a video playlist to third-party web sites (e.g., social networking sites). Other users can view the video link and playlist within the application. When a video from the list is selected, it plays on the selected device.

The system and methods can be used by a wide variety of users in addition to individual viewers. For example, companies that provide on-line video platforms that host videos for other individuals or companies can obtain useful advantages by integrating the platforms with the server system 24. Programming hooks can be created in the API so that the on-line video platform's media player can communicate with the server system 24. When media player commands for an on-line video platform are added to the system 24, the media player's API is placed in an API library and is stored in the API adapter 26. The on-line video platform can then offer customers the ability to add videos to their own mobile web sites that are enabled to operate with the server system 24.

The system and methods also can be used by content providers. For example, the content provider may want to deliver its media on-line. The content provider can use an on-line video platform that is enabled to operate with the server system 24. In some implementations, the content provider is allowed to add links to videos for that web site (i.e., mobile site or an application). The link facilitates synchronization to the secondary device 22 (e.g., a television set) and allows the end-user to load and control the video on the secondary device.

As used in this disclosure, terms such as "first," "second," etc. with respect to the messages are used simply as labels to distinguish the various messages from one another. Such terms do not imply that there cannot be any other messages prior to the first message or that there cannot be other messages between the first and second messages.

Implementations of the subject matter and the operations described in this specification can include digital electronic circuitry, or in computer software, firmware, or hardware, including the structures disclosed in this specification and their structural equivalents, or in combinations of one or more of them. Implementations of the subject matter described in this specification can include one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can include operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for performing actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile, audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Although this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described herein and the attachments hereto should not be understood as requiring such separation in all implementations, and it should be understood that the described program components and systems can generally be integrated together in a single software product or packaged into multiple software products.

Thus, although particular implementations have been described, other implementations are within the scope of the claims.

What is claimed is:

1. A non-transitory computer storage medium storing computer-useable instructions that, when used by one or more processors, cause the one or more processors to perform operations comprising:
   (a) request metadata relating to video content from a content provider separate from a server device;
   (b) receive the metadata relating to the video content from the content provider, the metadata satisfying one or more parameters;
   (c) display, on a first display of a first computing device, the metadata as displayed metadata;
   (d) receive, via the first display, a selection of video content based on the displayed metadata;
   (e) provide, from the first computing device, an indication of selected video content;
   (f) display, on the first display of the first computing device, a list of one or more remote display devices having a content provider-specific software media player, wherein said one or more remote display devices are connected to the server device via a network and configured to play the video content from the content provider via the content provider-specific software media player based on at least one command from the server device;
   (g) receive, from the first computing device, a remote display selection for displaying selected video content on a selected remote display device of the one or more remote display devices; and
   (h) transmit, from the first computing device via the server device over the network, a first formatted command to control the selected video content on the selected remote display device having the content provider-specific software media player, said control being based on one or more second formatted commands causing the selected remote display device to load the selected video content utilizing the content provider-specific software media player of the video content provider.

2. The medium of claim 1, wherein the instructions further cause the one or more processors to:
   (i) display, on the first display of the first computing device, content display controls, said content display controls comprising one of play, pause, stop, rewind, and fast forward;
   (j) receive, via the first display, a selection indicating a selected content display control of the content display controls; and
   (k) transmit, from the first computing device over the network, the selected content display control in the first format to control playback of the selected video content on the selected remote display device.

3. The medium of claim 1, wherein the network comprises Internet.

4. The medium of claim 3, wherein the network comprises an interconnected communications network of two or more devices located at the same site.

5. The medium of claim 1, wherein the network further comprises an interconnected communications network of two or more devices located at the same site.

6. The medium of claim 5, wherein the two or more devices located at the same site comprises at least the first computing device and the selected remote display device.

7. The medium of claim 6, wherein the two or more devices are connected, over the network, via a connection based on an identifier of the first computing device, an identifier of the selected remote display device, an account, or a synchronization code.

8. The medium of claim 7, wherein the identifier of the first computing device comprises a first IP address, a first MAC address, or a first identification or account number.

9. The medium of claim 8, wherein the identifier of the selected remote display device comprises a second IP address, a second MAC address, or a second identification or account number.

10. The medium of claim 7, wherein the synchronization code is displayed on the first computing device and the selected remote display device.

11. The medium of claim 1, wherein the network comprises an interconnected communications network of two or more devices located at the same site.

12. The medium of claim 1, wherein the first formatted command is in a first format and the second formatted command is in a second format.

13. The medium of claim 1, wherein the one or more parameters includes a search parameter.

14. The medium of claim 13, wherein the user-defined search parameter includes a user search inputted using a search tool of a second media player of the content provider.

15. The medium of claim 14, wherein the first computing device is a smartphone and the second media player of the content provider is a smartphone application.

16. The medium of claim 15, wherein the selected remote display device comprises one or more of a target device and a television.

17. The medium of claim 1, wherein the one or more parameters includes at least one of: an account, a predefined parameter, or user identification.

18. The medium of claim 1, wherein said metadata includes at least one of (1) an XML data file or (2) information and a link to the content provider.

19. The medium of claim 1, wherein the metadata contains at least one of a link or a title associated with the video content, wherein at least one of the link or the title corresponds to the displayed metadata.

20. The medium of claim 19, wherein the first formatted command comprises a portion of the link to control the selected video content on the selected remote display device.

* * * * *